United States Patent
Lengeling

(10) Patent No.: US 7,962,855 B2
(45) Date of Patent: Jun. 14, 2011

(54) METHOD OF DISPLAYING AN AUDIO AND/OR VIDEO SIGNAL IN A GRAPHICAL USER INTERFACE (GUI)

(75) Inventor: Gerhard Lengeling, Hamburg (DE)

(73) Assignee: Apple Inc., Cupertino, CA (US)

( * ) Notice: Subject to any disclaimer, the term of this patent is extended or adjusted under 35 U.S.C. 154(b) by 2829 days.

(21) Appl. No.: 10/334,252

(22) Filed: Dec. 31, 2002

(65) Prior Publication Data

US 2004/0125122 A1 Jul. 1, 2004

(51) Int. Cl.
*G06F 3/00* (2006.01)
(52) U.S. Cl. .......................................... 715/764
(58) Field of Classification Search .................. 715/716; 345/440
See application file for complete search history.

(56) References Cited

U.S. PATENT DOCUMENTS

| | | | |
|---|---|---|---|
| 4,257,104 A * | 3/1981 | Martin et al. | 702/68 |
| 5,777,598 A * | 7/1998 | Gowda et al. | 345/440 |
| 6,269,325 B1 * | 7/2001 | Lee et al. | 703/2 |
| 6,473,084 B1 * | 10/2002 | Phillips et al. | 345/440 |
| 6,603,477 B1 * | 8/2003 | Tittle | 345/440 |
| 6,868,508 B2 * | 3/2005 | Grey | 714/25 |
| 6,927,771 B2 * | 8/2005 | Ikami | 345/440 |
| 7,493,299 B2 * | 2/2009 | Entwistle | 706/50 |
| 2002/0038163 A1 * | 3/2002 | Hazama | 700/165 |
| 2002/0067358 A1 * | 6/2002 | Casari et al. | 345/440 |
| 2003/0037018 A1 * | 2/2003 | Entwistle | 706/48 |
| 2003/0093736 A1 * | 5/2003 | Grey | 714/738 |

* cited by examiner

*Primary Examiner* — Ryan F Pitaro
(74) *Attorney, Agent, or Firm* — Blakely, Sokoloff, Taylor & Zafman LLP

(57) ABSTRACT

The present invention relates to a method of manipulating an audio and/or video signal in a graphical user interface (GUI). An audio and/or video signal comprises a number of components, each of which having a variable which varies against another variable. In order to save displaying space in a GUI, in one embodiment, components with same variables and scales of the variables are selected and displayed in one axis. A primary component is picked and displayed in a mode that is easily distinguishable from other components displayed in the same axis.

16 Claims, 4 Drawing Sheets

METHOD OF DISPLAYING AN AUDIO AND/OR VIDEO SIGNAL IN A GRAPHICAL USER INTERFACE (GUI)

FIELD OF THE INVENTION

The present invention relates to a method of manipulating an audio and/or video signal in a graphical user interface (GUI) and a computer readable medium containing a program code for said manipulation.

BACKGROUND OF THE INVENTION

To date, the generation, manipulation and modification of video and audio signals is now very complex. Such processing of the video and audio signals is almost exclusively effected using dedicated hardware and/or in connection with a computer system. In either case, such processing requires a hard disc drive, input mediums such as from cameras or musical instruments or synthesisers, output mediums such as speakers and screens or graphical user interfaces (GUI) and control mediums such as a computer keyboard, mouse, joystick or rollerballs. The hard disc drive contains system programs for operating the various hardware and software.

Primarily the user interacts with the hardware and software to generate, manipulate and modify signals using the graphical user interface (GUI). Typically, the GUI includes windows, icons and menus both pull down and pop up as well as for displaying data and in particular with audio and/or video signals, the data is displayed in a 2-dimensional graphic manner.

Audio and/or video signals are often defined by various components. In an audio signal, such components may comprise different instruments or sound generations or frequency ranges. Manipulation of the signals involves varying one component in relation to the other components. When using a GUI, each component may be displayed on a separate axis. This results in a plurality of axes.

Due to the large number of components, there are typically a large number of axes which consume a large amount of space on the GUI. To accommodate for a plurality of such axes, it has been proposed to reduce each in size. When the axes have the same variables used on the ordinate and abscissa, then the axes can be displayed with one axis which is in line. An example of which is shown in FIG. 1. However it is difficult for the user to compare the data between the various axes and only a limited number of axes can be displayed at the same time.

SUMMARY OF THE INVENTION

The present invention is thus directed towards a method of manipulating an audio and/or video signal in a graphical user interface (GUI) and a computer readable medium containing a program code for said manipulation which facilitates the comparison between the components of the audio and/or video signals.

The present invention relates to a method of manipulating an audio and/or video signal in a graphical user interface (GUI), said signal comprising at least two components, each of which having a first variable which varies against a second variable, said method comprising:
  determining that the variables of said components are the same and have an equal scale;
  defining an axis with the first variable forming the ordinate and the second variable forming the abscissa;
  selecting one component to be a primary component; and
  displaying said components on the axis in the GUI by manipulating said primary component to be distinguished from the other component.

Preferably, the primary component is distinguished from the other component by varying the light intensity. In addition, there may be three or more components and each of the other components have the same light intensity. Alternatively, there may be three or more components and all of the other components are distinguished from each other by varying the light intensity.

The present invention also relates to a computer readable medium containing a program code for manipulating an audio and/or video signal in a graphical user interface (GUI), said signal comprising at least two components, each of which having a first variable which varies against a second variable, said method comprising:
  determining that the variables of said components are the same and have an equal scale;
  defining an axis with the first variable forming the ordinate and the second variable forming the abscissa;
  selecting one component to be a primary component; and
  displaying said components on the axis in the GUI by manipulating said primary component to be distinguished from the other component.

Moreover, the present invention also includes in a computer system, including a disc drive incorporating a system computer program, a display having a screen electrically connected to said disc drive, a method of manipulating an audio and/or video signal in a graphical user interface (GUI), said signal comprising at least two components, each of which having a first variable which varies against a second variable, said method comprising:
  determining that the variables of said components are the same and have an equal scale;
  defining an axis with the first variable forming the ordinate and the second variable forming the abscissa;
  selecting one component to be a primary component; and
  displaying said components on the axis in the GUI by manipulating said primary component to be distinguished from the other component.

BRIEF DESCRIPTION OF THE DRAWINGS

Embodiments of the present invention will now be described by way of further example only and with reference to the accompanying drawings, in which.

DETAILED DESCRIPTION

Figure 2:
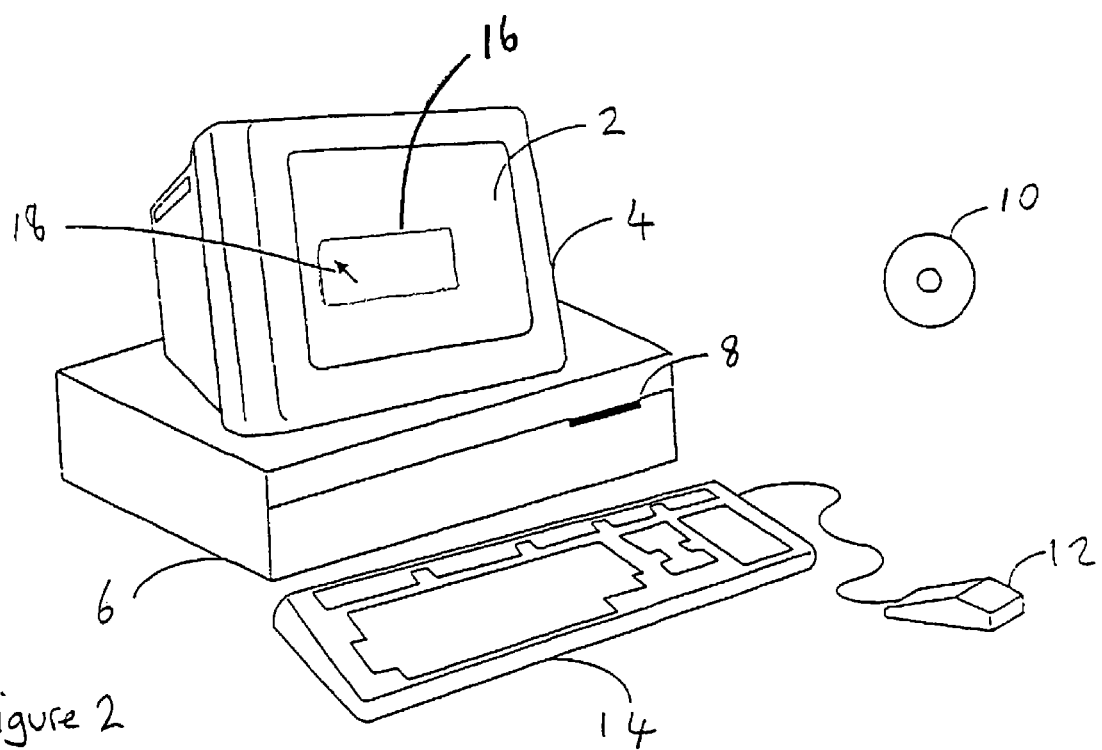
FIG. 2 illustrates a computer system which may be used in accordance with the present invention.

FIG. 2 illustrates a computer system which may be used in accordance with the present invention. The computer system comprises a screen 2 on a display monitor 4 which is connected to a hard disc drive 6 incorporating a temporary drive such as a CD-ROM, DVD, optical disc or floppy disc drive 8 in which is inserted a suitable data medium 10. The computer system also includes a mouse 12 and keyboard 14 both connected electrically to the hard disc drive. Other variations of the computer system can be envisaged. For example the use of a joystick or roller ball or stylus pen and/or a plurality of temporary and hard disc drives and/or connection of the computer system to the Internet and/or other applications of the computer system in a specific application which may not include a keyboard or mouse but rather input buttons and additional menus on the screen.

The screen includes a graphical user interface (GUI) 16. A cursor 18 is provided to highlight data or menus on the screen or GUI. The mouse or keyboard allows the user to move the cursor.

The hard disc drive includes system computer software for controlling the computer system. The software also includes control of the GUI. In particular, the software includes a program codes for manipulation of audio and/or video signals.

Figure 1:
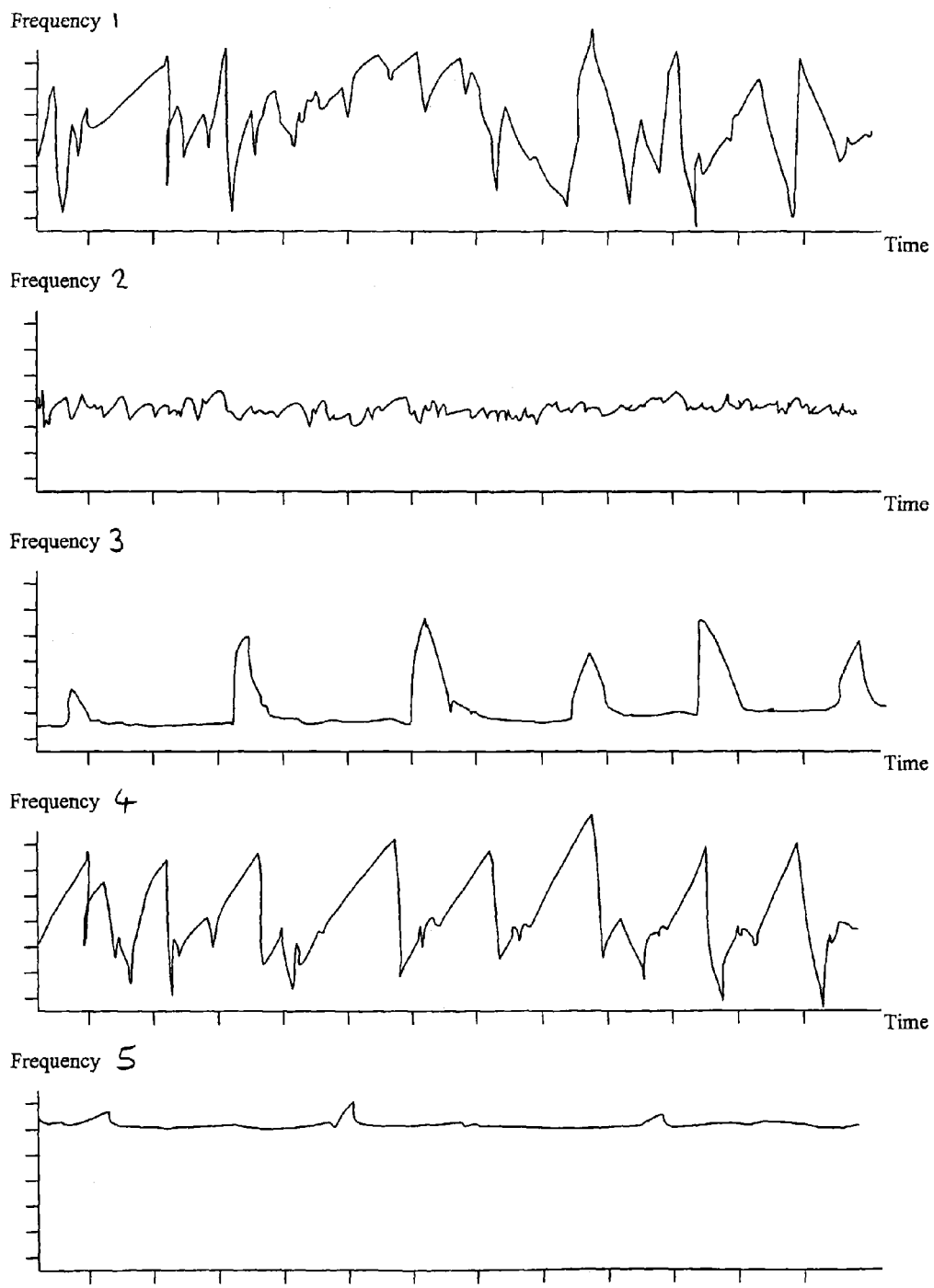
FIG. 1 illustrates a GUI of five components of a signal according to the prior art.
Figure 3:
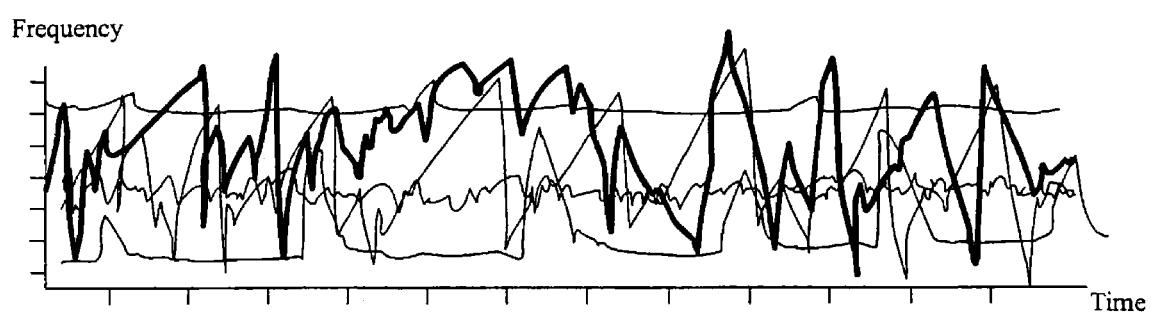
FIG. 3 illustrates a GUI of the same five components of a signal according to the present invention.

As noted previously, such signals may be defined into a number of components each of which may be displayed on an axis. The present invention manipulates those components on the GUI by presenting only one axis. A primary component is selected. The primary component and other components are displayed on the single axis. The primary component is distinguished from the other components. FIG. 3 illustrates the GUI with the signals manipulated according to the present invention. FIG. 3 illustrates the same components as shown in FIG. 1 except on a single axis. In FIG. 3, the primary component is distinguished from the other components by using a bolder line display.

In the preferred embodiment, the primary component is distinguished from the other components through being brighter than the other components. Another embodiment allows the primary component to be distinguished from the other component through selecting a particular colour. A still further embodiment allows the primary component to be distinguished from the other components through selecting a different type of line display. FIG. 3 illustrates a bolder line display but other different line displays may be used. For example, broken lines, dotted lines, patterned lines and so forth.

In any one of these embodiments, the other components may be distinguished from not only the primary component but also from the other components. That is to say, the other components can be prioritised into an order. Thus, in the preferred embodiment the primary component will be displayed with the maximum brightness, the most important other component with the next brightness level and so on. In the other embodiments, the program code or user may determine the colour or type of line display in order of importance.

A still further embodiment enables the method to select a combination of the distinguishing features. For example, the primary component may be displayed by being brighter than any of the other components and the other components are displayed in a different colour or different line display compared to the primary component and/or each other.

The present invention thus provides a method for manipulating audio and/or video signals in a GUI which enables the user to compare easily the components and across a large number of components at the same time.

Figure 4:
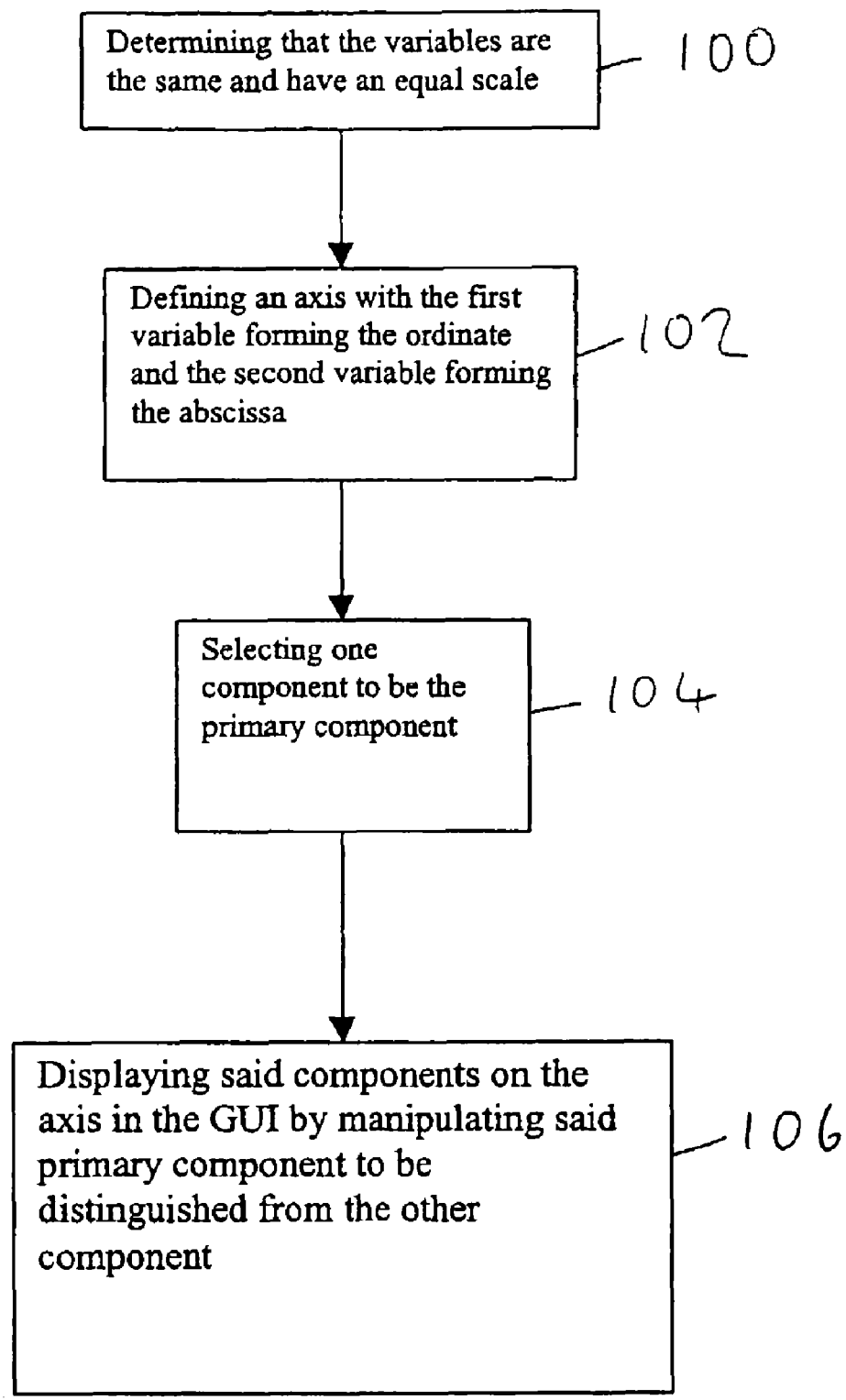
FIG. 4 illustrates a flow chart according to the present invention.

FIG. 4 illustrates a flow chart of the method according to the present invention. Step 100 involves evaluating the variables of the components of the signal to determine that the variables are the same and have an equal scale. If the variables are not the same or not of the same scale, then the components can not be compared directly using the same axes. The method includes advising the user, via the GUI, as to which components may not be included and/or with a request as to whether the particular variable or scale may be changed.

Step 102 collates details of the common axis and defines a single axis with the first variable forming the ordinate and the second variable forming the abscissa. This step also includes collating which components may be displayed using this single axis.

Step 104 includes selecting one component to be the primary component. The method may select the primary component or the user via the GUI. The distinguishing feature of the primary component is selected either by the method or by the user. The method or user may also select whether the other components are to be distinguished from each other. The method or user may also select which feature is in which priority for the distinguishing features of the other components. The user may select any of these variations using the GUI and one of the menus.

Having defined the axis and selected the primary component, the components are then displayed on the GUI in step 106.

If the user wishes to select another component as the primary component, then the using the GUI, the user may highlight the other component and indicate that it is now to be the primary component. The former primary component is then displayed as one of the other subsidiary components.

A user may, using the GUI, altar the primary component. The altered primary component can be stored in a memory of the computer system. The components can then be redisplayed with the altered primary component to allow comparison between the altered primary component and the other components in order to enhance and improve the manipulation of the signal.

The aforegoing description has been given by way of example only and it will be appreciated by a person skilled in the art that modifications can be made without departing from the scope of the present invention.

What is claimed is:

1. A method of manipulating an audio and/or video signal in a graphical user interface (GUI), said signal comprising at least two components, each of which having a first variable which varies against a second variable, said method comprising:

determining that the variables of said components are the same and have an equal scale;

defining an axis with the first variable forming the ordinate and the second variable forming the abscissa;

selecting one component to be a primary component;

displaying said components on the axis in the GUI by manipulating said primary component to be distinguished from the other component; and advising a user, through the GUI, that at least one of the components does not have the same variables in response to determining that the at least one of the components does not have the same variables.

2. A method as claimed in claim 1, in which said primary component is distinguished from the other component by varying the light intensity.

3. A method as claimed in claim 2, in which there are three or more components and each of the other components have the same light intensity.

4. A method as claimed in claim 2, in which there are three or more components and all of the other components are distinguished from each other by varying the light intensity.

5. A method as claimed in claim 1, in which said primary component is distinguished from the other component by varying the colour.

6. A method as claimed in claim 1, in which said primary component is distinguished from the other component by varying the type of line display.

7. A method as claimed in claim 1, further comprising changing the primary component by selecting the other component to be the primary component and changing the former primary component to be the other component.

8. A computer readable medium containing a program code for manipulating an audio and/or video signal in a graphical user interface (GUI), said signal comprising at least two components, each of which having a first variable which varies against a second variable, said method comprising:
- determining that the variables of said components are the same and have an equal scale;
- defining an axis with the first variable forming the ordinate and the second variable forming the abscissa;
- selecting one component to be a primary component;
- displaying said components on the axis in the GUI by manipulating said primary component to be distinguished from the other component; and
- advising a user, through the GUI, that at least one of the components does not have the same variables in response to determining that the at least one of the components does not have the same variables.

9. In a computer system, including a disc drive incorporating a system computer program, a display having a screen electrically connected to said disc drive, a method of manipulating an audio and/or video signal in a graphical user interface (GUI), said signal comprising at least two components, each of which having a first variable which varies against a second variable, said method comprising:
- determining that the variables of said components are the same and have an equal scale;
- defining an axis with the first variable forming the ordinate and the second variable forming the abscissa;
- selecting one component to be a primary component;
- displaying said components on the axis in the GUI by manipulating said primary component to be distinguished from the other component; and
- advising a user, through the GUI, that at least one of the components does not have the same variables in response to determining that the at least one of the components does not have the same variables.

10. In a computer system as claimed in claim 9, said method further comprising:
- storing in said disc drive said primary component and said other component;
- recording any changes to said primary component; and
- redisplaying said primary component with said changes and said other component.

11. A method as in claim 1 further comprising:
- presenting, through the GUI, a request to a user as to whether a scale of a component is to be changed.

12. A method as in claim 1 further comprising selecting another component to be the primary component to replace the one component.

13. A medium as in claim 8, wherein the method further compromises comprises:
- presenting, through the GUI, a request to a user as to whether a scale of a component is to be changed.

14. A medium as in claim 8, wherein the method further comprises:
- selecting another component to be the primary component to replace the one component.

15. A computer readable medium containing program instructions for presenting data having at least two components, each of which having a first variable which varies against a second variable, the instructions, when executed by a data processing system cause the system to perform a method comprising:
- determining that the variables of a first set of components are the same;
- defining a set of axes with a set of the variables of the first set of components;
- determining that the variables of a second set of components are not the same as the variables of the first set and, in response, advising a user, through a graphical user interface (GUI), that the second set cannot be presented, on a graph in the GUI, with the first set.

16. A method for presenting data having at least two components, each of which having a first variable which varies against a second variable, the method comprising:
- determining that the variables of a first set of components are the same;
- defining a set of axes with a set of the variables of the first set of components;
- determining that the variables of a second set of components are not the same as the variables of the first set and, in response, advising a user, through a graphical user interface (GUI), that the second set cannot be presented, on a graph in the GUI, with the first set.

* * * * *

UNITED STATES PATENT AND TRADEMARK OFFICE
CERTIFICATE OF CORRECTION

| | | |
|---|---|---|
| PATENT NO. | : 7,962,855 B2 | Page 1 of 1 |
| APPLICATION NO. | : 10/334252 | |
| DATED | : June 14, 2011 | |
| INVENTOR(S) | : Gerhard Lengeling | |

It is certified that error appears in the above-identified patent and that said Letters Patent is hereby corrected as shown below:

IN THE SPECIFICATIONS:
In column 4, line 22, delete "altar" and insert -- alter --, therefor.

IN THE CLAIMS:
In column 6, line 10, in Claim 13, after "further" delete "compromises".

Signed and Sealed this
Twenty-ninth Day of November, 2011

David J. Kappos
*Director of the United States Patent and Trademark Office*